United States Patent Office 3,510,785
Patented May 5, 1970

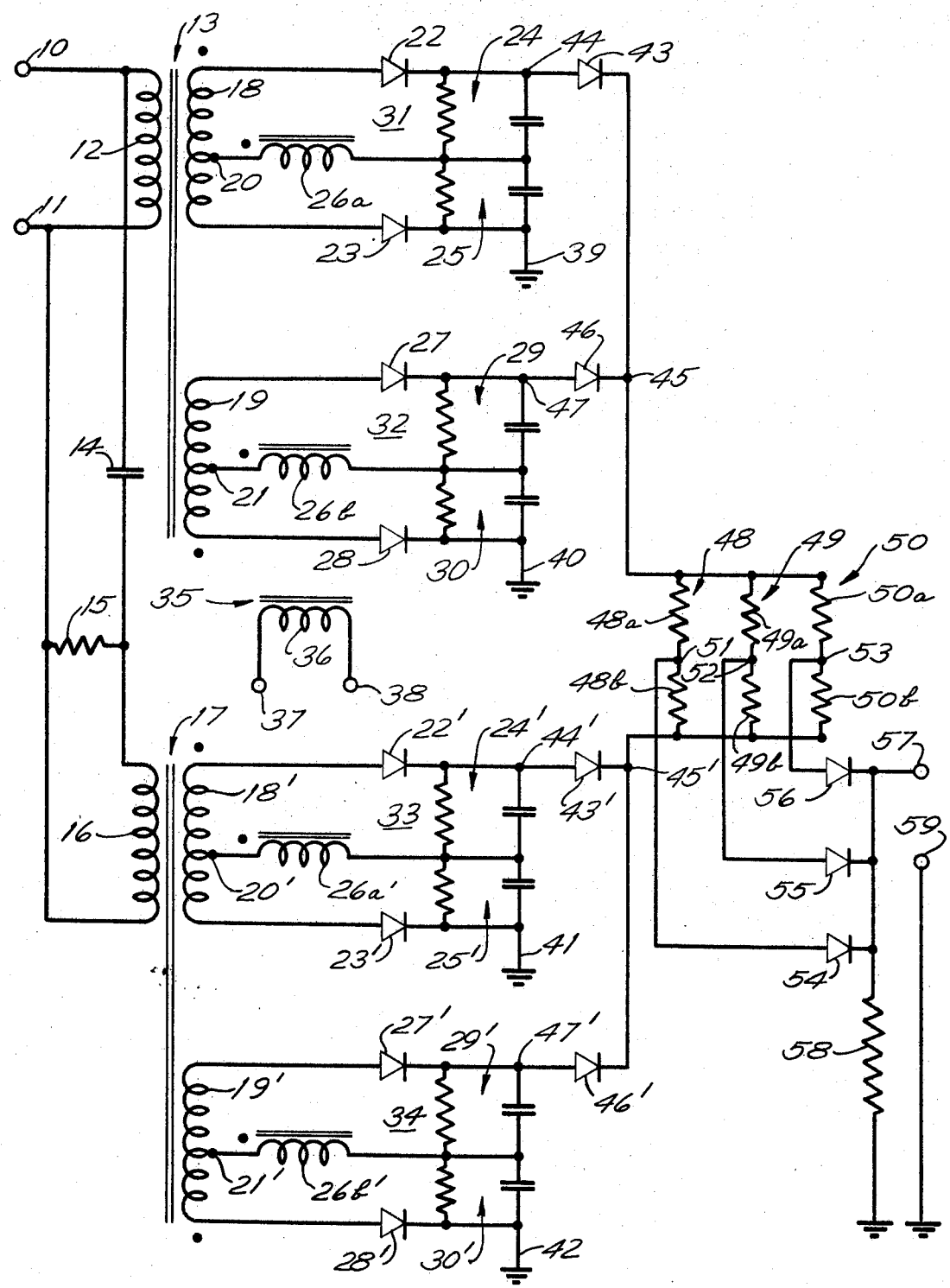

3,510,785
NONPHASE SENSITIVE SYNCHRONOUS DETECTOR
Alfred G. Ratz, Woodbridge, Conn., assignor to Textron Inc., Providence, R.I., a corporation of Delaware
Filed May 1, 1967, Ser. No. 635,181
Int. Cl. H03k 9/06
U.S. Cl. 328—134                              8 Claims

ABSTRACT OF THE DISCLOSURE

A composite signal is combined in one pair of phase-sensitive detector circuits with a signal in phase and 180° out of phase with respect to a reference signal to produce a signal which when selected by an OR circuit is proportional to the magnitude of $E \cos \theta$. A 90° phase shift in the reference signal supplied to a second pair of phase-sensitive detector circuits and an OR circuit yields $E \sin \theta$. A trigonometric network multiplies $E \cos \theta$ and $E \sin \theta$ by $\cos \theta$ and $\sin \theta$, respectively, and adds to yield $E \cos^2 \theta + E \sin^2 \theta$ which equals E, the magnitude of the component of the composite signal having the same frequency as the reference signal.

---

The present invention relates to synchronous detectors and, more particularly, to a nonphase-sensitive synchronous detector.

Often there is need for analyzing a composite signal to determine the magnitude of a component thereof corresponding to a particular discrete frequency. Where the frequency of the component in question is fixed, the analysis can be performed with the aid of a sharply tuned passive filter. However, where the frequency of the component is variable and of unknown phase the problem is much more complicated.

Analysis, by way of approximation, can be performed on a variable frequency basis through the use of a plurality of adjacent sharply tuned filters. This method is quite costly where the analysis must be performed to a high degree of precision requiring filters with extremely steep ramps and narrow bandwidths.

As an example, in the vibration testing art it is often necessary to analyze the frequencies of vibration imparted to a specimen as a result of excitation by various signals. Consider the very simple case of excitation with a pure sinusoidal signal. Generally, it is necesssary to test the specimen over a broad band of input frequencies. But, it should be evident that to analyze the vibration imparted to the specimen at each of the excitation frequencies will require either a bank of adjacent filters or a tracking filter. Add to the foregoing the fact that invariably the signal will experience some indeterminate shift in phase during its conversion first into mechanical motion of the shaker table and specimen and then back to an electric signal via an electromechanical transducer, and the difficulties will be obvious.

Assuming that the frequency of the component to be analyzed is the same as the frequency of the input signal, a synchronous detector can be employed if its output can be made independent of the difference in phase between the input signal and the component in the composite signal. It is, therefore, the purpose of the present invention to provide a nonphase-sensitive synchronous detector.

According to the invention there is provided a nonphase-sensitive synchronous detector for providing from a composite signal an output signal proportional to the magnitude, E, of the component of the composite signal having the same frequency as but indeterminate phase displacement, $\theta$, relative to a reference frequency signal, the detector comprising means for producing from the composite signal and the reference signal a first and a second signal proportional, respectively, to the magnitude of $E \cos \theta$ and $E \sin \theta$, and means responsive to the first and second signal for providing an output signal proportional to $E \cos^2 \theta + E \sin^2 \theta$.

The invention will be better understood after reading the following detailed description of the presently preferred embodiment thereof with reference to the appended drawings where in the sole figure is a schematic circuit diagram of the detector in accordance with the invention.

Referring to the drawing there is shown a pair of input terminals 10 and 11 connected directly to the primary winding 12 of a transformer 13. The terminals 10 and 11 are also connected through a 90° phase shifting network consisting of capacitor 14 and a resistor 15 to the primary winding 16 of a second transformer.

Transformer 13 is provided with a pair of secondary windings 18 and 19, of opposite phase, as shown, provided with center taps 20 and 21, respectively. The opposite ends of windings 18 are connected through unilateral conducting devices 22 and 23, respectively, to the resistance-capacitance time constant networks 24 and 25. The common juncture of networks 24 and 25 is connected through a secondary winding 26a of a transformer, to be described, to the center tap 20. Similarly, the opposite ends of winding 19 are connected, respectively, through unilateral conducting devices 27 and 28, the resistance-capacitance time constant networks 29 and 30, and secondary winding 26b to the center tap 21.

The portions of the circuit just described as connected to windings 18 and 19 should be recognized as a pair of conventional phase-sensitive detector circuits. For convenience, these shall be identified as phase detectors 31 and 32, respectively.

An identical pair of phase detectors 33 and 34 are associated with transformer 17. For simplicity, the same reference numerals are used as were used in describing circuits 31 and 32 except for the addition of a prime mark.

The secondary windings 26a, 26b, 26a' and 26b' are all associated with a single transformer, 35, having a primary winding 36 provided with input terminals 37 and 38.

As shown, the junction of device 23 and network 25 is connected to a point of reference potential or ground at 39. Similarly, the detector circuits 32, 33, and 34 are grounded at 40, 41 and 42, respectively.

A unilateral conducting device, 43, connects the output point, 44, of circuit 31 to a junction point, 45. Another unilateral conducting device, 46, similarly connects the output point, 47, of circuit 32 to the same junction point, 45. Likewise, a further pair of unilateral conducting devices, designated by the same numerals primed, connects circuits 33 and 34 from output points 44' and 47' to a junction point, 45'.

A plurality of resistance paths designated generally as 48, 49 and 50 are connected in parallel between the points 45 and 45'. Each path is provided with an intermediate tap, 51, 52, 53, respectively, dividing the paths into two resistive portions. Thus, path 48 is composed of portions 48a and 48b; path 49 is composed of portions 49a and 49b; and path 50 is composed of portions 50a and 50b.

Taps 51, 52, and 53 are connected, respectively, through unilateral conducting devices 54, 55 and 56 to a common junction and output terminal 57. A resistor 58 is connected between terminal 57 and ground. A second output terminal 59 is also connected to ground, as shown.

The reference frequency signal, sinusoidal in character, is applied to terminals 10 and 11. Signals of the same frequency are induced in winding 18 in phase, and in winding 19, 180° out of phase with the reference signal. As a result of the capacitor 14 and the resistor 15, the signals in windings 18' and 19' will be shifted, respectively, +90° and −90° in phase relative to the reference signal.

The composite signal to be analyzed is applied to terminals 37 and 38. It should be understood that the first pair of phase-sensitive detector circuits, 31 and 32, will compare the composite signal with the signals appearing in windings 18 and 19 to provide a first pair of D.C. voltages between points 44 and 47, respectively, and ground. The voltages at points 44 and 47 relative to ground will both be proportional to $E \cos \theta$, but one will be reversed in polarity relative to the other.

The unilateral conducting devices 43 and 46 constitute an OR circuit for selecting that one of the first pair of D.C. voltages having a given polarity. With the orientation of the devices 43 and 46 as shown, the positive voltage relative to ground will be selected and passed to point 45.

In view of the 90° phase shift of the reference signal the second pair of phase-sensitive detector circuits, 33 and 34, will produce a second pair of D.C. voltages at points 44′ and 47′ which are both proportional to $E \sin \theta$, but of opposite polarity. A second OR circuit consisting of devices 43′ and 46′ selects that one of the pair of D.C. voltages which is positive, and passes it to point 45′. Thus, a first signal is produced at point 45 and a second signal at point 45′ which are proportional, respectively, to the magnitude of $E \cos \theta$ and $E \sin \theta$.

It will now be explained how the resistance paths 48, 49 and 50, along with devices 54, 55 and 56, provide an arrangement responsive to the two signals appearing at points 45 and 45′ for providing an output signal at terminals 57 and 59 proportional to $E \cos^2 \theta + E \sin^2 \theta$.

Resistors 48a and 50b are chosen each with conductance $G = K \cos 15°$ where K is a constant of proportionality. The conductance of each of resistors 48b and 50a is made equal to $K \cos 75°$. Resistors 49a and 49b are of equal value and each has a conductance equal to $K \cos 45°$.

The devices 54, 55 and 56 constitute another OR circuit for selecting from taps 51, 52 and 53 the most positive voltage and passing it to the output terminals.

Each resistance path may be viewed as a summing circuit with respect to the signals at points 45 and 45′. In addition, the signals appearing at point 45 are effectively multiplied by $\cos \theta$, at least to the extent of the approximation represented by the paths corresponding to $\theta = 15°$, 45° and 75°. In similar manner the signals at point 45′ are multipiled by $\sin \theta$ to the same approximation. By reason of the correspondence of the resistance paths to the three discrete angles, the network is theoretically accurate only at such phase angles. However, it can be shown that the error is no more than 2% for any angle other than 15°, 45° and 75°.

In the illustrated embodiment a three-path resistance network has been employed. However, fewer or more paths can be employed depending upon the desired accuracy. The requirement can be generalized by stating that the number of resistance paths is equal to $(a+2)$ where $a$ is a positive integer including zero. The taps are located along each path such that for each path the conductances between the tap and the input points 45 and 45′ are proportional, respectively, to $\cos \theta$ and $\sin \theta$ where $\theta$ is equal to $$\frac{n \times 45°}{a+2}$$

and $n$ is for each path a different odd integer between zero and $(2a+3)$. In the illustrated example $a=1$ and $n$ has the values of 1, 3, and 5, corresponding respectively with paths 48, 49 and 50.

As illustrated in the drawing the OR circuits are polarized to select the positive input signals. Obviously, the various unilateral devices can be reversed in polarity to select the negative input signals. Preferably, the unilateral conducting devices take the form of crystal rectifiers or the like, although any rectifying device can be employed.

Strictly by way of example, the following circuit constants are set forth as providing a satisfactory embodiment.

Transformers 13, 17 and 35: standard 100 kc. modulator transformers using toroidal cores.
Resistance-capacitance time constant circuits 24, 24′, 25, 25′, 29, 29′, 30, 30′: each resistor=22,000 ohms; each capacitor=7.5 mfd.
Unilateral devices, 22, 22′, 23, 23′, 27, 27′, 28, 28′, 43, 43′, 46, 46′, 54, 55, 56, each: type IN456A diode.

| | Ohms |
|---|---|
| Resistors 48a, 50b | 54,000 |
| Resistors 48b, 50a | 205,000 |
| Resistors 49a, 49b | 75,000 |
| Resistor 58 | $2 \times 10^6$ |

Having described the invention with reference to the presently preferred embodiment thereof it will be understood by those skilled in the art that numerous changes may be made therein without departing from the true spirit of the invention as defined in the appended claims.

What is claimed is:
1. A nonphase-sensitive synchronous detector for providing from a composite signal an output signal proportional to the magnitude, E, of the component of said composite signal having the same frequency as but indeterminate phase displacement, $\theta$, relative to a reference frequency signal, said detector comprising means for producing from said composite signal and said reference signal a first and second signal proportional, respectively, to the magnitude of $E \cos \theta$ and $E \sin \theta$, and means responsive to said first and second signals for providing an output signal proportional to $E \cos^2 \theta + E \sin^2 \theta$ by at least approximately multiplying said first and second signals, respectively, by $\cos \theta$ and $\sin \theta$ and adding the products.

2. A nonphase-sensitive synchronous detector according to claim 1, wherein the means for producing said first and second signals comprises a first pair of phase-sensitive detector circuits for comparing said composite signal with signals of the same frequency as said reference signal, respectively, in phase and 180° out of phase with said reference signal to provide thereby a first pair of D.C. voltages both proportional to $E \cos \theta$, a first OR circuit for selecting that one of said first pair of D.C. voltages having a given polarity, a second pair of phase-sensitive detector circuits for comparing said composite signal with signals of the same frequency as said reference signal but shifted, respectively, ±90° in phase relative to said reference signal to provide thereby a second pair of D.C. voltages both proportional to $E \sin \theta$, and a second OR circuit for selecting that one of said second pair of D.C. voltages having said same given polarity.

3. A nonphase-sensitive synchronous detector according to claim 2, wherein the first and second OR circuit each comprises a pair of unilateral conducting devices, the same one electrode of each device being connected to the corresponding phase-sensitive detector for receiving said D.C. voltage, the other electrode of the devices of one OR circuit being joined at a common point to provide said first signal, and the other electrode of the devices of the other OR circuit being joined at another common point to provide said second signal.

4. A nonphase-sensitive synchronous detector according to claim 1, wherein said means for providing said output signal comprises a network having a first input point for receiving said first signal and a second input point for receiving said second signal, all relative to a point of reference potential, a plurality of resistance paths equal in number to $(a+2)$ where $a$ is a positive integer including zero, said paths being connected in parallel between said input points, an intermediate tap along each path, and an OR circuit coupling all of said taps to an output terminal for coupling that tap with the maximum potential of a given polarity to said output, said taps being located along each of said paths such that for each path the conductances between the tap and said first and second input point are proportional, respectively to cos $\theta$ and sin $\theta$ where $\theta$ is equal to $$\frac{n \times 45°}{a+2}$$

and $n$ is for each path a different odd integer between zero and $(2a+3)$.

5. A nonphase-sensitive synchronous detector according to claim 4, wherein $a=1$.

6. A nonphase-sensitive synchronous detector according to claim 4, wherein the means for producing said first and second signals comprises a first pair of phase-sensitive detector circuits for comparing said composite signal with signals of the same frequency as said reference signal, respectively, in phase and 180° out of phase with said reference signal to provide thereby a first pair of D.C. voltages both proportional to $E \cos \theta$, a second OR circuit for selecting that one of said first pair of D.C. voltages having a given polarity, a second pair of phase-sensitive detector-circuits for comparing said composite signal with signals of the same frequency as said reference signal but shifted, respectively, ±90° in phase relative to said reference signal to provide thereby a second pair of D.C. voltages both proportional to $E \sin \theta$, and a third OR circuit for selecting that one of said second pair of D.C. voltages having said same given polarity.

7. A nonphase-sensitive synchronous detector for providing from a composite signal an output signal proportional to the magnitude E of the component of said composite signal having the same frequency as but indeterminate phase displacement, $\theta$, relaitve to a reference frequency signal, said detector comprising a first pair of phase-sensitive detector circuits for comparing said composite signal with signals of the same frequency as said reference signal, respectively, in phase and 180° out of phase with said reference signal to provide thereby a first pair of D.C. voltages both proportional to $E \cos \theta$, a first OR circuit for selecting that one of said first pair of D.C. voltages having a given polarity to thereby provide a first signal proportional to the magnitude of $E \cos \theta$, a second pair of phase-sensitive detector circuits for comparing said composite signal with signals of the same frequency as said reference signal but shifted, respectively, ±90° in phase relative to said reference signal to provide thereby a second pair of D.C. voltages both proportional to $E \sin \theta$, a second OR circuit for selecting that one of said second pair of D.C. voltages having said same given polarity to thereby provide a second signal proportional to the magnitude of $E \sin \theta$, and means responsive to said first and second signals for providing an output signal proportional to $E \cos^2 \theta + E \sin^2 \theta$.

8. A nonphase-sensitive synchronous detector according to claim 7, wherein the first and second OR circuit each comprises a pair of unilateral conducting devices, the same one electrode of each device being connected to the corresponding phase-sensitive detector for receiving said D.C. voltage, the other electrode of the devices of one OR circuit being joined at a common point to provide said first signal, and the other electrode of the devices of the other OR circuit being joined at another common point to provide said second signal.

References Cited

UNITED STATES PATENTS

| | | | |
|---|---|---|---|
| 2,397,961 | 4/1946 | Harris | 328—144 X |
| 2,703,380 | 3/1955 | Fraser | 328—133 X |
| 2,979,662 | 4/1961 | Farrow | 328—139 |
| 3,225,316 | 12/1965 | Savaga | 329—50 X |
| 3,253,223 | 5/1966 | Kettel | 328—133 X |

DONALD D. FORRER, Primary Examiner

R. C. WOODBRIDGE, Assistant Examiner

U.S. Cl. X.R.

328—133, 139, 165; 329—50; 235—186